United States Patent [19]

Boehringer

[11] 4,428,196

[45] Jan. 31, 1984

[54] AIRCRAFT SPLIT HYDRAULIC SYSTEM

[75] Inventor: Wilfred E. Boehringer, Fullerton, Calif.

[73] Assignee: McDonnell Douglas Corporation, Long Beach, Calif.

[21] Appl. No.: 196,665

[22] Filed: Oct. 14, 1980

[51] Int. Cl.³ .............................................. F15B 11/16
[52] U.S. Cl. ........................................ 60/403; 60/420; 60/430
[58] Field of Search ................ 60/420, 421, 430, 429, 60/403

[56] References Cited

U.S. PATENT DOCUMENTS 2,745,357  5/1956  Strayer .
3,138,002  6/1964  Ernst et al. .

Primary Examiner—Arnold Rosenthal
Attorney, Agent, or Firm—Paul T. Loef; George W. Finch; Donald L. Royer

[57] ABSTRACT

A hydraulic system having two pumps, typically driven by two independent prime movers, a primary and secondary reservoir and associated valving to permit the system to run as one system or two independent systems, all for the purpose of redundancy and safety. The system senses fluid level in the primary reservoir and actuates the valves to establish two independent hydraulic systems, each with its own reservoir, when the fluid level drops below a predetermined level. The system is particularly advantageous in twin-engine aircraft where three hydraulic systems are employed, one off of each engine, and the third system uses two pumps, one driven by each engine.

10 Claims, 1 Drawing Figure

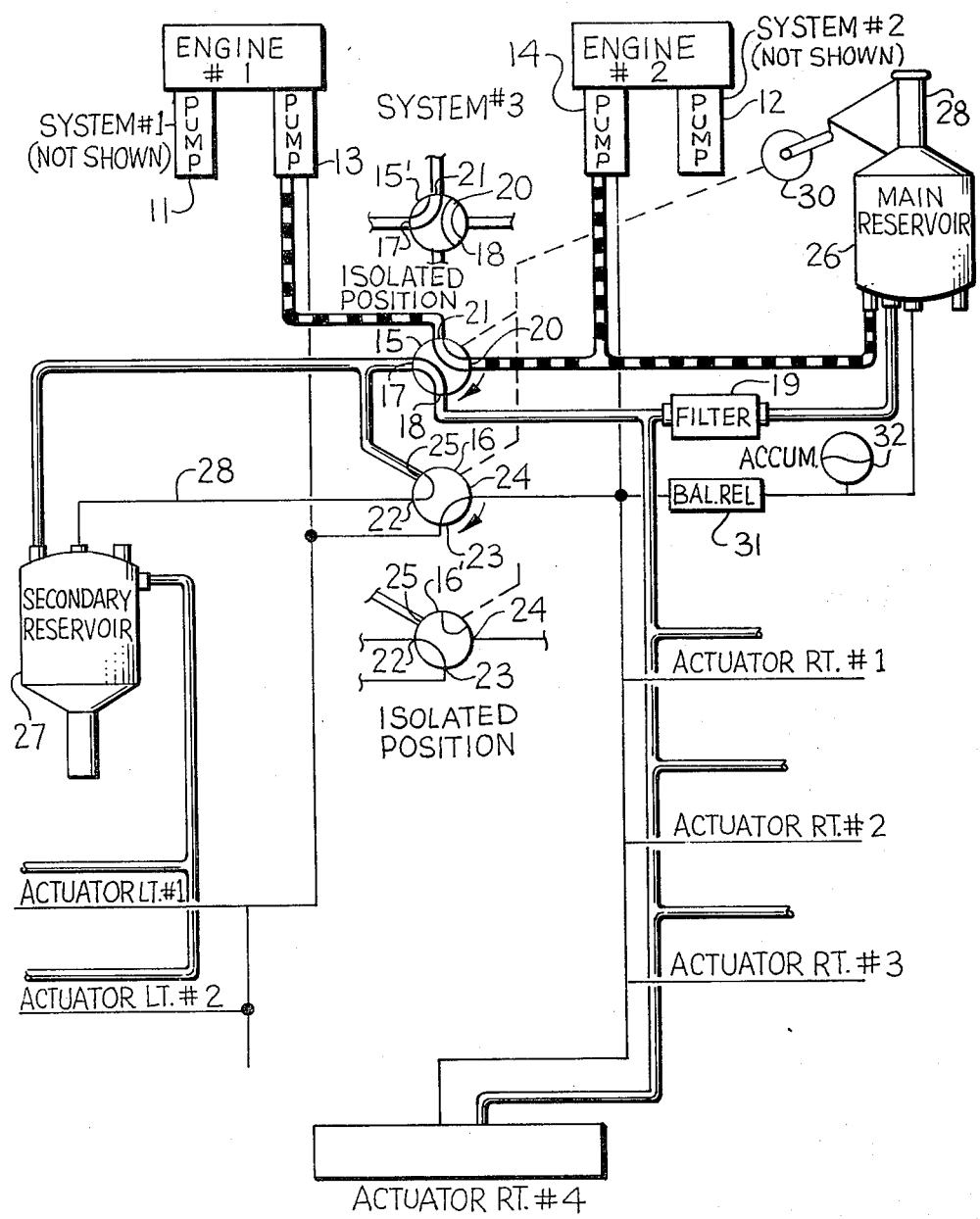

AIRCRAFT SPLIT HYDRAULIC SYSTEM

BACKGROUND OF THE INVENTION

This invention relates to hydraulic systems. More particularly, this invention relates to hydraulic systems having more than one pump which can function alternately as one system or two systems.

Prudent design standards for contemporary commercial aircraft dictate that power redundancy be provided to flight control surfaces. Typically, ailerons, elevators, flaps, rudders, slats, and spoilers are moveable surfaces which may be hydraulically controlled as well as brakes, landing gear and steering. Redundancy may be supplied, in part, by multiple hydraulic systems, usually three in number. Control surfaces are further divided into those that move up and down and those that move in one direction only as in the latter case, symmetry may be essential and corresponding surfaces may have to move together on a single hydraulic system. However, assuming multiple spoilers on each wing, the outboard pair of spoilers on each wing may move on one hydraulic system while the center spoilers on a second system and the inboard spoilers on a third system. The rationale, of course, being that if an aircraft lost the No. 3 hydraulic system, all it would lose was the inborad set of spoilers on each wing, leaving the center pairs and outboard pairs active. Collection of control systems or other systems to be driven by a specific hydraulic system must take into consideration proximity of one system to another to accommodate major damage to all systems in a particular area and still maintain sufficient control surfaces to fly the airplane. When an aircraft has three or more engines, the obvious choice is to drive the three independent hydraulic systems from three separate engines. The three independent hydraulic systems become more vulnerable in a twin-engine configuration if two different systems are driven from a common engine as they both would be lost by failure of that particular engine. One alternative to provide redundancy is shown in U.S. Pat. No. 3,138,002 by Ernst et al which teaches three independent servo systems of equal capacity and if one fails, the pilot simply shuts that system off and selects a second system and still has a remaining backup. It is important to note that this system involves a positive shutoff valve to each system where total hydraulic power is cut off to the control surfaces. Shutoff valves in any control surface system are generally to be avoided as they will eventually be shut off whether inadvertently or otherwise when they need not be shut off. More interesting, is the teaching of this reference wherein one pump is driven by engine No. 1, the second pump by engine No. 2, and the third pump driven by both engines through a differential gear box. This redundancy, of course, is desirable, however, near impossible to achieve in modern aircraft. The rotating shafts must penetrate the fuselage. Further, if possible, it would not be weight efficient. The instant invention accomplishes this feature, and more, in an entirely different way.

Another alternative is to drive the third system with an electric motor which may be powered from either engine. However, this alternative sacrifices space and weight and still requires judicious location of wires to minimize vulnerability.

SUMMARY OF THE PRESENT INVENTION

It is therefore an object of the present invention to provide a hydraulic system having two or more pumps, driven by two separate prime movers which is capable of functioning either as a single system or two independent hydraulic systems.

Another object of the invention is to provide a twin-engine aircraft with three hydraulic systems and the loss of one engine will not knock out more than one hydraulic system. It is a further object of the split hydraulic system of the present invention to enhance aircraft survivability after sustaining major hydraulic system damage in a local area by always preserving at least one half a system for flight controls.

In summary, the hydraulic system of this invention accomplishes the above objects and overcomes the disadvantages of prior systems by providing a hydraulic system which has two pumps, two reservoirs and valve means which are automatically switched in the event of a loss of hydraulic fluid to isolate the two systems. The two hydraulic pumps may be driven by two separate engines so as to provide redundant power sources to accommodate an engine out condition. The system also allows one pump to operate unloaded until the system demand exceeds the output of one pump or the systems are split.

BRIEF DESCRIPTION OF THE DRAWING

The FIGURE shows a schematic of a twin-engine aircraft having three hydraulic systems, systems 1 and 2 are conventional and not shown in detail, while system 3 represents the present invention and is shown in some detail along with alternate positions of the two isolation valves.

DETAILED DESCRIPTION OF THE PREFERRED EMBODIMENT

The FIGURE shows a schematic of a twin-engine aircraft, having engines No. 1 and 2, driving three independent hydraulic systems. Engines 1 and 2 drive pumps 11 and 12, respectively, one off each engine. These systems are conventional systems and no detail is shown and are noted simply to show the overall scheme. System 3 consists of pump 13 driven by engine No. 1 and pump 14 driven by engine No. 2. In the schematic, the double-lined alternate solid and clear pipes indicate suction lines and clear double-lined pipes return lines, while the single solid line indicates pressure lines. Portions of the lines change functions as the isolation valves 15 and 16 are switched to the isolated position, which will be discussed infra. With the isolation valves 15 and 16 in the position shown in the main schematic, ports 20 and 21 are connected so as to interconnect the suction side of both pumps 13 and 14 to the main reservoir 26. Ports 17 and 18, on the same valve, connect what is shown as a common return line whicn, in turn, connects to the secondary reservoir 27. A portion of the line shown as a pressure line at 28 is actually functioning as a return line in this mode of operation as ports 22 and 25 are connected in valve 16. Ports 23 and 24 of valve 16 are connected so as to connect the two pressure outputs of the pump 13 and 14. Typically pumps 13 and 14 are variable displacement pumps and the volume is automatically increased to maintain system pressure as the demand rises. Further, one pump is running essentially unloaded until the system demand warrants by means commonly known to those skilled in the art.

Therefore, pumps 13 and 14 are connected by a common suction line to the main reservoir 26. The high pressure side of the two pumps is connected to the ports 23 and 24 so as to feed the actuators right No. 1-4 and actuator left No. 1 etc off of a common system. The return lines are also connected through ports 17 and 18 of valve 15 through the filter 19 to the main reservoir 26. In this mode the secondary reservoir 27 behaves simply as a large void in the system, and is full of oil.

Both reservoirs, the main reservoir and the secondary reservoir are shown as a type known as a bootstrap reservoir wherein the reservoir is pressurized with oil from the main system. The reservoir is in essence a large cylinder which is loaded by high pressure applied to a smaller cylinder internal to the reservoir. The smaller cylinder is in part housed inside piston rod 28.

Should a line be severed, as in an accident, or rupture, the system oil would leak and the reservoir charging piston would advance in the direction to maintain suction side super charge pressure. Connected to the piston rod 28 is the sensor 30 and when the rod 28 advances a predetermined amount, the sensor 30 triggers the two isolation valves 15 and 16 to rotate port positions. Many alternate types of sensors could perform this function and what would probably be most common in an industrial system is a liquid level indicator. At any rate, the two valves 15 and 16 are driven to the isolated positions shown at 15' and 16', respectively. Ports 17 and 21 connect so as to isolate the suction side of the pump 13 from the main reservoir 26 and connect it to the secondary reservoir 27. At the same time ports 18 and 20 go to shut-off. Concurrently, valve 16 rotates to the position shown at 16'. In the isolated position port 23 is connected to port 22 which applies pump output pressure to the secondary reservoir 27 which is required to super charge the reservoir as indicated in the discussion of the bootstrap main reservoir. Ports 25 and 24 go to shutoff which interrupts the pressure connection between pumps 13 and 14. It should now be reasonably clear that the two systems, i.e. the systems supplied by pump 13 and the system supplied by pump 14 are isolated and function as two independent systems. Of course, whichever system was severed or ruptured would totally deplete that particular reservoir eventually, but one half of the system would remain in tact.

Alternately, if one engine quit, all that would be lost would be a single pump as the two systems would remain tied together and function as usual with a reduced maximum flow capacity.

The right-hand portion of the system shows a balance relief valve at 31 and an accumulator at 32 which are simply refinements in the system and are not essential to its function. However, the balance relief valve functions as a check valve in combination with a relief valve which senses outside pressure rather than downstream pressure to charge the accumulator while allowing flow back into the system above a certain pressure. This allows the accumulator to maintain a supercharge pressure on the suction side of the pump and helps to dampen pressure pulses as well as increases the system response for large flow demands.

It may thus be seen that the hydraulic system arrangement depicted in the embodiment of this invention serves to solve the indicated problem and enhances flight control power redundancy to accommodate either an engine-out condition or a system failure which results in an oil loss such as a ruptured component.

What is claimed is:

1. A split hydraulic system to drive a first and second system load comprising:
   a first hydraulic pump having a suction port and a pressure port;
   a main reservoir connected to said suction port of said first hydraulic pump;
   pressure connection between said pressure port of said first hydraulic pump and said first system load;
   return line connection between said first system load and said main reservoir;
   a second hydraulic pump having a suction port and a pressure port;
   a first valve means, normally open, connecting said suction port of said second hydraulic pump to said main reservoir;
   pressure connection between said pressure port of said second hydraulic pump and said second system load;
   a secondary reservoir;
   return line connection between said second system load and said secondary reservoir;
   a second valve means, normally closed, connected between said secondary reservoir and said suction side of said second hydraulic pump;
   a third valve means, normally open, connecting said secondary reservoir to said main reservoir;
   a fourth valve means, normally oen, connecting said pressure connection from said first hydraulic pump to said pressure connection from said second hydraulic pump; and
   means to open said second valve means, and close said first, third, and fourth valve means whereby said system may function as one single system or two isolated systems in the event of a major loss of hydraulic fluid.

2. The split hydraulic system of claim 1 further comprising sensing means to sense fluid level in said main reservoir and automatic means to open said second valve means and close said first, third, and fourth valve means when said fluid level in said main reservoir reaches a predetermined level.

3. The split hydraulic system of claim 2 wherein each of said first and second hydraulic pumps is driven by separate prime movers.

4. A split hydraulic system comprising:
   a main reservoir;
   first and second hydraulic pumps having suction ports and pressure ports;
   a first valve means having two positions and four ports, said first position connecting ports 1 and 2 and ports 3 and 4 and said second position connecting ports 1 and 4 while ports 2 and 3 are shut off with said suction port of said first hydraulic pump connected to said first port and said suction port of said second hydraulic pump connected to a suction line between said second port of said first valve means and said main reservoir;
   a secondary reservoir connected by a return line to said fourth port of said first valve means and said third port of said first valve means connected to said main reservoir;
   a second valve means connected between the pressure output line from said first hydraulic pump and the pressure output line from said second hydraulic pump; and
   means to actuate said first and second valve means.

5. The split hydraulic system of claim 4 further comprising means to sense the hydraulic fluid level in said main reservoir and actuate said first and second valve means when the hydraulic fluid level reaches a predetermined level, whereby the hydraulic system works as a single system with two hydraulic pumps which is automatically switched to two independent systems in the event that the fluid level in the main reservoir drops below a predetermined level.

6. The split hydraulic system of claim 5 wherein each of said first and second hydraulic pumps is driven by separate prime movers.

7. The split hydraulic system of claim 6 wherein said secondary reservoir is of the bootstrap type having suction, return and press ports, and said second valve means is a two position, four port valve, said first position connecting ports 1 and 4 and ports 2 and 3 and said second position connecting ports 3 and 4 while ports 1 and 2 are shut off, with port 2 connected to said second hydraulic pump output pressure port and port 3 connected to said first hydraulic pump output pressure port and port 1 connected to said return line between said fourth port of said first valve means and said secondary reservoir while port 4 is connected to said pressure port on said secondary reservoir whereby the secondary reservoir is pressurized so as to supercharge the suction side of the pump when the two systems are split.

8. The split hydraulic system of claim 7, wherein the means to sense the fluid level in the main reservoir is a liquid level controller.

9. The split hydraulic system of claim 7 wherein said main reservoir is of the bootstrap type having suction, return and pressure ports and the high pressure line from said second hydraulic pump is connected to said pressure port of said main reservoir, through a balanced relief valve and an accumulator so as to provide the main reservoir with a super charge.

10. The split hydraulic systems of claim 7 wherein said first and second hydraulic pumps are controlled to match volumetric pump output to system demand.

* * * * *